Nov. 7, 1967 N. K. JENSEN 3,351,088
LOW PRESSURE ALARM VALVE
Filed July 20, 1965 2 Sheets-Sheet 1

INVENTOR.
NATHAN KENNETH JENSEN
BY
Williamson & Palmatier
ATTORNEYS

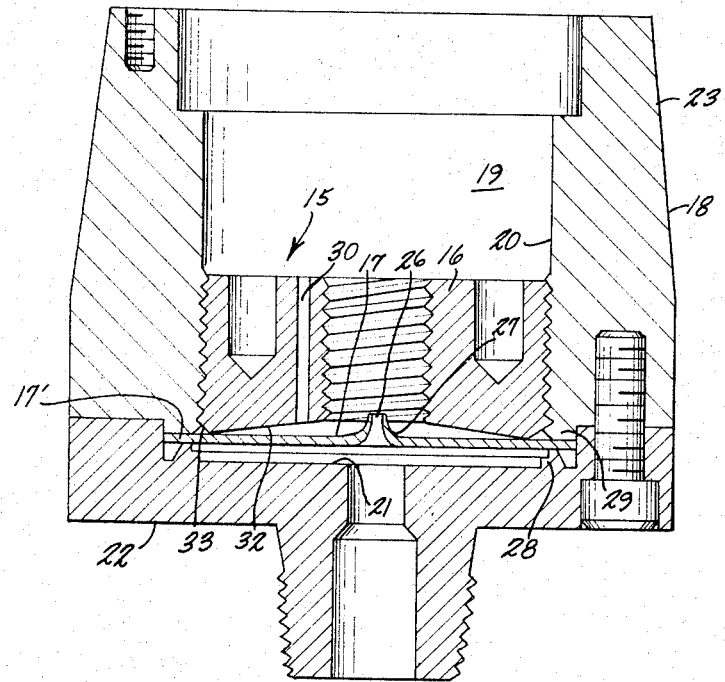
FIG. 2
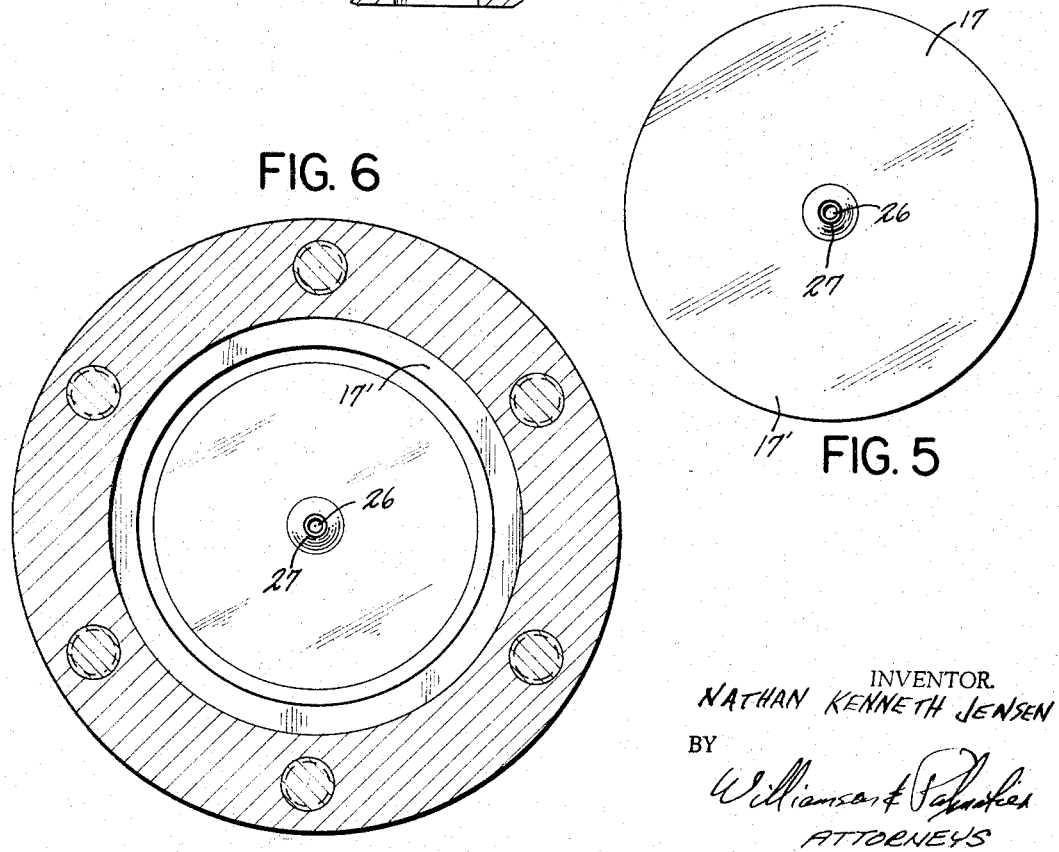
FIG. 6
FIG. 5
INVENTOR.
NATHAN KENNETH JENSEN
BY
Williamson & Palmatier
ATTORNEYS United States Patent Office 3,351,088
Patented Nov. 7, 1967

3,351,088
LOW PRESSURE ALARM VALVE
Nathan Kenneth Jensen, 202 Peninsula Road,
Minneapolis, Minn. 55427
Filed July 20, 1965, Ser. No. 473,353
5 Claims. (Cl. 137—517)

This invention relates to a pressure responsive valve which is particularly applicable for use in a low pressure sensing alarm so that the alarm is sounded whenever a gas pressure decreases below a predetermined minimum, and more particularly this invention relates to a valve which continuously senses the pressure of a gas source very accurately and repeatedly senses a predetermined pressure when pressures of continuingly increased magnitude are applied thereto so as to effect an opening of the valve.

Valves have been known, in the past, for sensing fluid pressure so as to open the valve when the fluid pressures decrease to a certain level. However, such previously known valves, although operating satisfactorily in the range of 70 pounds per square inch or greater pressure, have not operated satisfactorily and consistently to a high degree of accuracy at fluid pressures which are considerably lower that that level.

An object of my invention is to provide a valve which will operate in response to pressures of a predetermined magnitude so as to consistantly operate at the identical pressure level through numerous and repeated valve operations.

Another object of my invention is to provide a novel and improved fluid pressure responsive valve for sensing continuingly decreasing fluid pressures and to operate when the fluid pressure reaches a predetermined minimum, and constructed so that the valve will accurately and repeatedly sense pressures in the range of below 40–50 pounds per square inch.

A further object of the invention is to provide a pressure responsive valve to operate and open after sensing continuously decreasing gas pressures and in direct response to a sensed fluid pressure which, depending upon the desires of those operating the system and the necessary requirements, may be a minimum pressure in the range of 40 to 50 pounds per square inch, 100 pounds per square inch or 1000 pounds per square inch or higher or any pressure level intermediate these several ranges specified.

These and other objects and advantages of the invention will more fully appear from the following description made in connection with the accompanying drawings, wherein like reference characters refer to the same or similar parts throughout the several views, and in which:

FIG. 2 is a longitudinal section view showing the present invention partially assembled;

FIG. 5 is an elevation view of the operating disc, as the disc appears prior to assembly with the remainder of the valve mechanism, substantially as illustrated in FIG. 2;

FIG. 6 is a detail transverse section taken approximately at 6—6 in FIG. 3.

Figure 3:
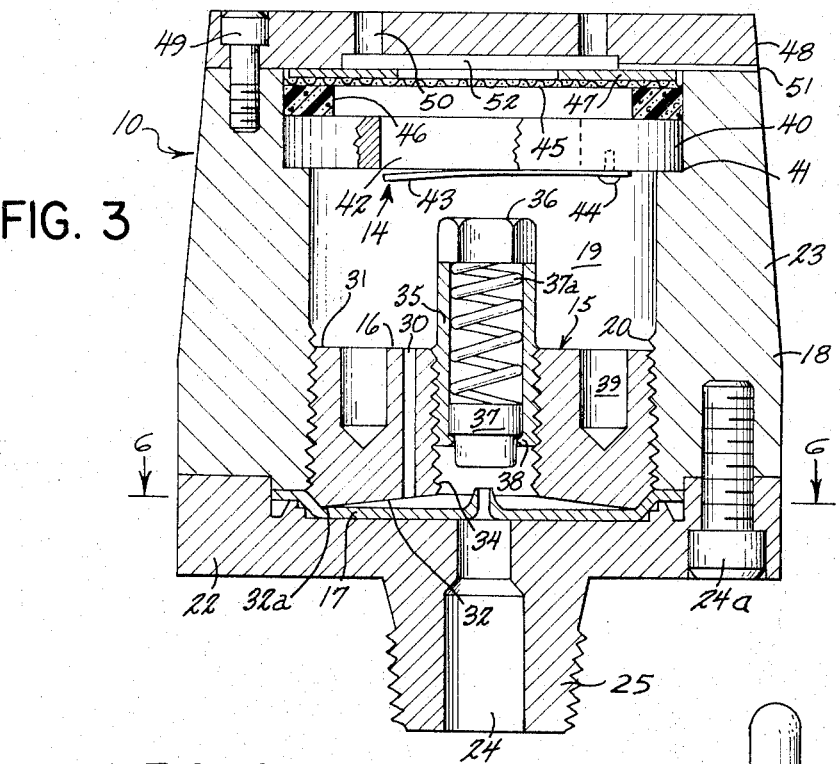
FIG. 3 is a longitudinal section view of the valve completely assembled and ready for operation.

One form of the invention is shown in the drawings and is described herein.

Figure 1:
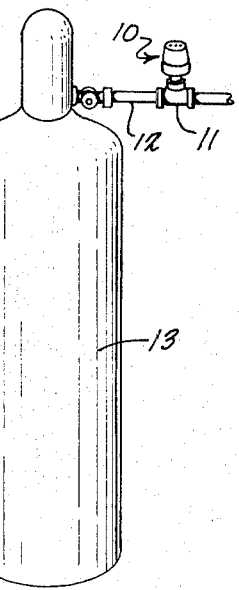
FIG. 1 is a perspective view of a typical installation of the present invention.

The alarm is indicated in general by numeral 10 and is illustrated in FIG. 1 in a typical installation, being connected by a pipe T 11 in the gas discharge pipe 12 which is connected to a bottle or tank of gas under pressure, such as oxygen as is used in the operating room of a hospital. The alarm 10 will sense the pressure of the gas flowing in the pipe 12, and when the pressure of the gas diminishes to a predetermined level, the alarm 10 will sound off to draw attention to the dangerously low gas pressure. An attendant will thereby be reminded to utilize an alternative source of gas pressure.

The alarm 10 includes a sound producing device 14 which is operated by gas which is allowed to escape through and from the valve 15. The valve 15 includes a valve body or plug 16, a disc 17 and a housing 18. The housing 18 has an interior chamber 19 with a threaded interior peripheral wall 20. The end surface 21 of the chamber 19 in housing 18, is defined by the base 22 which is affixed to the generally circular wall portion 23 of the housing as by screws 24a. The base 22 has a gas inlet port 24 therethrough and extending through a threaded boss 25 which is adapted for connection to a pipe T, such as illustrated in FIG. 1 at 11.

The disc, as illustrated in FIGS. 2 and 5, has a small centrally located valve port 26 therethrough and a rearwardly projecting sharp edged annulus 27 surrounding the port 26. Initially as illustrated in FIGS. 2 and 5, the disc is substantially flat excepting for the rearwardly projecting annulus 27. The base 22, of the housing, has an annular ledge 28 which cooperates with the end annular shoulder 29 of the wall portion of the housing 18, to define a clamp which tightly grips the peripheral edge portion 17' of the disc. The clamping action on the edge portion of the disc is very tight and sufficiently tight so that there will be no possibility of lateral movement of the disc 17 in the direction of the plane of the disc.

As it will be seen in FIG. 5, the disc 17 is substantially circular in shape, and the disc 17 is constructed of substantially rigid, but somewhat flexible and deformable metal, such as beryllium copper or phosphorous bronze.

The valve body 16, of the valve 15, has a threaded exterior periphery so as to be threadably movable along the threaded inner wall 20 of the interior chamber 19 of the housing 18. The valve body 16 also has an escape port or gas discharging port 30 extending longitudinally through the valve body 16 and entirely from the rear end 31 of the valve body to the slightly tapered annular and generally conical front end face 32 thereof. The outer periphery 32a of the end face 32, is disposed slightly inwardly and forwardly from the end of the outer peripheral threads of the valve body 16. The front end of the valve body is provided with a forwardly and outwardly facing tapered disc-engaging and forming surface 33 between the outer periphery 32a of the front end face 32 and the outer periphery of the valve body 16.

The valve body has a rear opening 34 at the inner periphery of the annular front face 32 and the opening 34 is threaded to receive a spring-mounting cup 35 which has a closed end 36 disposed rearwardly of the valve body 16 and mounting a yieldable valve seat 37 therein. The valve seat 37 formed of a slightly resiliently deformable plastic materials, such as a plastic known as "Teflon," and is slidable in mounting cup 35. The valve seat 37 is spring pressed forwardly by a coil spring 37a disposed in the mounting cup 35. The forward end of the cup 35 has an inwardly formed bead 38 to act as a stop to limit the forward movement of the valve seat 37 toward the disc 17. It will be seen that by adjusting the position of the cup 35 in the threaded opening 34 of the valve body, the forward limit of movement of the valve seat 37 can be changed.

The valve body 16 is also provided with sockets or recesses 39 formed in the rear portion of the valve body to receive a tool of appropriate shape and dimensions for turning the valve body 16 in the housing 18. When the disc 17 is initially assembled with the housing 18, as illustrated in FIG. 2, the valve body 16 is either in the approximate position, illustrated in FIG. 2, or is moved rearwardly from the position illustrated, away from the disc so that the disc may be properly seated in the housing and tightly gripped so as to be subsequently immovable. After the disc 17 has been effectively clamped by the housing, the valve body 16 is threaded forwardly along the housing interior chamber wall 20 and into engagement with the disc. The outer periphery 32a of the front face 32 is the first portion of the valve body which actually engages the disc 17, and then the valve body 16 is forcibly turned additionally, so that the disc 17 is tensioned and stretched, and metal is caused to flow in the disc 17 until the disc 17 is deformed to the shape illustrated in FIGS. 3 and 6. When the valve body, bearing against and through the disc 17, bottoms against the end surface 21 of the interior chamber 19, the desired deformation and stretching of the disc 17 has been obtained. It will be understood that during this tensioning and stretching of the disc, the disc 17 actually stretches in the direction of the plane of the disc and in multiple, radial outward directions so that the disc is effectively tensioned and stretched over the outer periphery 32a of the end face 32 of the valve body. The tensioning and stretching of the disc, wherein there is an actual flow of metal, causes stresses to be established in the metal of the disc, especially in the area of the outer periphery 32a of the end face 32. Even though such stresses are created in the metal of the disc, the stresses existing in the disc after the deformation thereof are substantially uniform around the entire periphery of the disc which avoids the problems which are related to unevenness in the thickness of the disc, even though such unevenness may be microscopic and also avoids the problems associated with buckling and random stretching of various portions of the disc.

When the valve body has been forcibly projected forwardly so that the front end of the valve body, acting through the disc, bottoms in the surface 21 of the housing, the valve 15 is ready for use and presetting so that the valve will operate at a desired fluid pressure. It will be understood that discs of several thicknesses may be provided so that an appropriate disc may be applied to the valve in relation to the expected range of gas pressures in which the valve is to be operated. For instance, if the valve is to be operated in the range of 40 p.s.i., that is, to open and permit passage of gas when the diminishing pressure reaches a predetermined magnitude of 40 p.s.i., a relatively thin disc 17 is employed. On the other hand if the valve is to operate in the range of 1000 p.s.i., a somewhat thicker and stiffer disc 17 is utilized.

Figure 4:
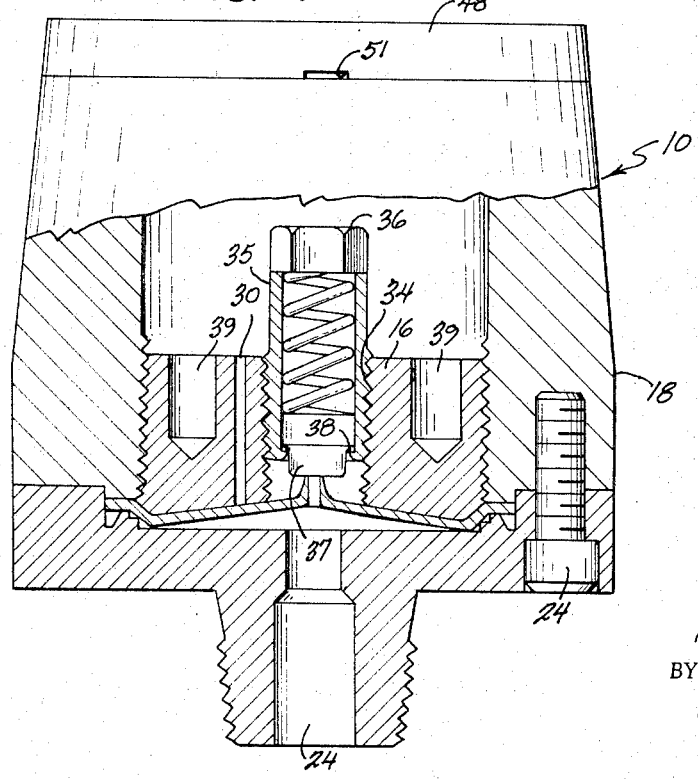
FIG. 4 is an elevation view, partially in section and showing the valve with fluid pressure applied thereto and in shifted or closed position.

When a substantial fluid pressure is applied through the port 24 and against the disc 17, the disc 17 flexes in the manner illustrated in FIG. 4 so as to substantially conform to the slightly tapered and generally conical shape of the end face 32. The knife edged annulus 27 of the disc 17 engages and seals against the valve seat 37 which is moved rearwardly away from the stops 38 by the disc 17. The spring 38 resists the gas fluid pressure from moving the valve seat 37 out of engagement with the knife edged annulus 27 and the port 26 is thereby maintained in closed condition. As the gas pressure applied through the port 24 progressively decreases, the resiliency of the beryllium copper disc 17, in opposing the disc-flexing action of the gas pressure, tends to return the disc 17 to its normal substantially planar condition so that the disc 17 pulls forwardly away from the conical face 32 and as the gas pressure progressively decreases, the resiliency of the disc allows the valve seat 37 to again engage the stops 38 which prevent further forward movement of the valve seat with the movement of the disc 17. The knife edged annulus 27 will thereafter pull away from the valve seat 37 which allows gas to flow through the port 26 which equalizes the pressure on opposite sides of the disc 17 and the disc 17 will immediately return to its normal condition as illustrated in FIG. 3 and gas is allowed to flow through the valve port 26 and through the escape port 30.

When gas is permitted to flow through the escape port 30, the gas operates the sound producing device 14.

Prior to the assembly of the sound producing device 14 with the housing 18, the mounting cup 35, which effectively is a part of the valve body 16, is adjusted longitudinally along the inner periphery of opening 34 so that the normal position of the valve seat 37 may be changed and therefore the minimum pressure necessary to effect opening of the valve is changed. It has been found that by utilizing the tensioned disc 17 in this valve, the valve will consistantly and reliably operate at a very low gas pressure over an accumulated long period of time. For instance, it may be desired to effect operation of the sound producing device when the pressure in the tank 13 decreases below 50 p.s.i. The mounting cup 35 is adjusted so that the valve 15 consistently operates when the gas pressure reduces to 50 p.s.i. So long as the disc 17 is not tampered with nor removed or released by the housing, the valve will open each time the gas pressure in the tank 13 decreases below 50 p.s.i. The accuracy over a long period of time and in successive operations of the valve is outstanding.

The sound producing device may take any of a number of forms. It has been found effective to utilize a mounting ring 40 supported on a ledge 41 in the housing 18. The mounting ring 40 has an air discharging slot 42 therethrough. A reed 43, which is made of metal is affixed to the mounting ring 40 as by rivet 44. A wire gauze or screen 45 is mounted on a rubber ring 46 overlying the mounting ring 40, and a retaining and protective washer 47 overlies the screen 45. A cap 48 is affixed to the end of the housing 18 as by screws 49 and the cap 48 has a plurality of apertures 50 therein to allow the gas from the escape port 30 and from the slot 42 to escape to the atmosphere. The cap 48 has a plurality of channels 51 formed in its inner face and extending radially to the exterior of the housing to allow a gas to escape as an alternative course to the apertures 50. It will be noted that the gap 48 is recessed at 52 so that the inner periphery of the annular ring 47 may project radially inwardly of the apertures 50 so that no prod or other probe can be extended down into the chamber 19 of the housing.

It will be seen that I have provided a new and improve low pressure gas alarm valve which consistently and reliably operates at the same identical predetermined minimum gas pressure each time the valve is operated.

It will, of course, be understood that various changes may be made in the form, details, arrangement and proportions of the various parts without departing from the scope of my invention.

I claim:

1. A pressure sensing valve responsive to diminishing fluid pressures to open when said pressure has reduced to a predetermined magnitude,
   comprising a valve body including a rear end and a front end having a front end annular face slightly conically tapered and convergent in a rearward direction, said end face having an outer periphery and an inner periphery, said body having a fluid escape port therethrough and through said front and rear ends and between the inner and outer peripheries of said end face,
   a forwardly facing valve seat within said inner periphery of said end face,
   a metallic, resilient, flexible and circular disc confronting the end face of said valve body in concentric relation therewith and lying against said outer periphery, said disc being adapted to flex and lie flush against said end face under influence of fluid pressure thereagainst and said disc having a central portion with a valve port therethrough and said central portion being engageable with said valve seat for closing said valve port, said circular metal disc normally lying substantially in a plane and being tensioned in the direction of said plane and radially outward in multiple directions over the outer periphery of said end face whereby the resiliency of said tensioned disc opposes the disc-flexing fluid pressure holding the disc against the valve seat and conically tapered end face and said resiliency returns the central portion of said disc away from the valve seat at uniform and predetermined pressure in sequential instances to permit fluid flow through said valve port and escape port, and means mounting the disc and applying and retaining tension on the disc in said directions and applying fluid pressure against the disc for flexing toward said end face.

2. The valve of claim 1 wherein said valve seat is mounted for movement in a fore and aft direction, and a spring urging said valve seat toward the disc, and an adjustable stop restricting movement of said valve seat toward said disc, whereby adjustment of said stop regulates the extent of movement of the valve seat with the disc during resilient return of the disc to normal position to thereby control the position at which the central portion of the disc pulls away from the valve seat and the magnitude of the fluid pressure at which the valve opens.

3. A pressure sensing valve responsive to diminishing fluid pressure to open when said pressure has reduced to a predetermined magnitude, comprising a valve body including a rear end and a front end having a front end annular face slightly conically tapered and convergent in a rearward direction, said end face having an outer periphery and an inner periphery, said body having a fluid escape port therethrough and through said front and rear ends and between the inner and outer peripheries of said end face, a forwardly facing valve seat within said inner periphery of said end face, a metallic, resilient, flexible and circular disc confronting the end face of said body in concentric relation therewith and lying against said outer periphery, said disc normally lying substantially in a plane and having an edge portion disposed outwardly of the outer periphery of said end face, said disc being adapted to flex at the outer periphery of said end face and lie flush against said end face under influence of fluid pressure thereagainst, and said disc having a central portion with a valve port therethrough and said central portion being engageable with said valve seat for closing said valve port, the resiliency of said disc opposing the disc-flexing fluid pressure holding the disc against the valve seat and the conically tapered end face and said resiliency returning the central portion of said disc away from the valve seat when the fluid pressure against the disc is reduced to permit fluid flow through said valve port and escape port, means mounting the disc and valve body and adapted to receive and apply fluid pressure against the disc for flexing toward said end face, and said means including an annular clamp spaced outwardly of the outer periphery of said end face and concentric therewith, said clamp tightly gripping the outer edge of the disc, said clamp being movable axially rearwardly along said valve body for tensioning and stretching said metal disc in the direction of the plane of said disc and radially outwardly in multiple directions over the outer periphery of said end face to effectively cause the resiliency of the disc to return said central portion away from the valve seat for opening said ports consistantly at a predetermined pressure in sequential operations of the valve.

4. The valve as set forth in claim 3 wherein said valve body is threadably connected to said clamp, the outer periphery of said rearwardly convergent conically tapered end face being spaced concentrically inwardly and forwardly from the threaded outer periphery of said valve body to facilitate formation of an annular offset crimp around the periphery of said disc to thereby effect tensioning and stretching of the disc over the outer periphery of said conically tapered end face when the valve body is threadably moved along the clamp.

5. A pressure sensing valve responsive to diminishing fluid pressures to open when said pressure has reduced to a predetermined magnitude, comprising a valve body having a rear end and a front end with a front end annular face slightly conically tapered and convergent in a rearward direction, said end face having an outer periphery and an inner periphery, said body having a fluid escape port therethrough and through said front and rear ends between the inner and outer peripheries of said end face, said valve body having a threaded outer periphery spaced outwardly and rearwardly from the outer periphery of said end face to define a generally forwardly and outwardly facing, annular and tapered disc-engaging surface on the front end of the valve body, a forwardly facing valve seat within said inner periphery of said end face and movable forwardly and rearwardly of the valve body, stop means adjustably mounted on said valve body for movement in a fore and aft direction and limiting forward movement of said valve seat, spring means urging said valve seat forwardly toward said stop means, and permitting rearward movement of the valve seat against the spring pressure, a metallic, resilient, flexible and circular disc confronting the end face of said valve body in concentric relation therewith and lying against said outer periphery, said disc normally lying substantially in a plane and having an outer edge portion extending outwardly from the outer periphery of said end face, said disc being adapted to flex and lie flush against said conically tapered end face under influence of fluid pressure thereagainst, and said disc having a central portion with a valve port therethrough, and said central portion being engageable with said valve seat for closing said valve port the resiliency of said disc opposing disc-flexing fluid pressure holding the disc against the valve seat and conically tapered end face and said resiliency returning the central portion of the disc away from the valve seat when the pressure decreases below a predetermined magnitude to permit fluid flow through said valve port and escape port, a housing having an interior chamber confining the front end of said valve body and having a threaded interior surface adjustably mounting said valve body to permit relative endwise movement between the housing and valve body, said housing having an end surface in said chamber and confronting the disc and disposed opposite the conically tapered end face of the valve body, said housing having a fluid pressure inlet port communicating through said end surface, said housing also having an annular clamp spaced rearwardly from said end surface adjacent the periphery of said valve body and said clamp tightly gripping the outer edge of the disc, said valve body having means for forcibly turning the valve body to effect endwise movement thereof against said disc for causing annular deformation of the disc at the outer periphery of the conically tapered end face and across the breadth of the disc engaging surface, said end surface of the interior chamber limiting endwise movement of the valve body and limiting the deformation of said disc, whereby the deformation of the disc produces tensioning and stretching of the disc in the plane of the disc and in multiple directions radially outwardly of the disc and over the outer periphery of said conically tapered end face, whereby the pressures at which the valve port is opened in sequential operations of the valve remain constant.

References Cited

UNITED STATES PATENTS

| | | | |
|---|---|---|---|
| 213,118 | 3/1879 | Locke | 137—525 X |
| 1,895,591 | 1/1933 | Spencer | 92—98 X |
| 2,615,685 | 10/1952 | Mellert | 137—525 X |

FOREIGN PATENTS 572,153  3/1959  Canada.

WILLIAM F. O'DEA, *Primary Examiner.*

D. J. ZOBKIW, *Assistant Examiner.*